United States Patent [19]
Garfinkle

[11] 3,922,121
[45] Nov. 25, 1975

[54] ROTARY COMBUSTION ENGINE

[76] Inventor: Marvin Garfinkle, 1136 Morefield Road, Philadelphia, Pa. 19115

[22] Filed: Mar. 6, 1974

[21] Appl. No.: 448,728

[52] U.S. Cl. .............................................. 418/61 A
[51] Int. Cl.² .......................................... F04C 1/02
[58] Field of Search .................................. 418/61 A

[56] References Cited
UNITED STATES PATENTS

| | | | |
|---|---|---|---|
| 3,213,714 | 10/1965 | Hejj et al. | 418/61 A |
| 3,348,529 | 10/1967 | Assum | 418/61 A |
| 3,696,614 | 10/1972 | Hartmann et al. | 418/61 A |

FOREIGN PATENTS OR APPLICATIONS

| | | | |
|---|---|---|---|
| 527,253 | 10/1921 | France | 418/61 B |
| 1,451,713 | 3/1970 | Germany | 418/61 A |

*Primary Examiner*—C. J. Husar
*Assistant Examiner*—Leonard Smith
*Attorney, Agent, or Firm*—Edward E. Sachs

[57] ABSTRACT

A rotary engine of the Wankel type in which the power output of the rotor is transmitted through a coupling arrangement to the drive shaft to obtain a 1:1 speed ratio therebetween. The coupling is a linkage mechanism or an orbital shaft with gearing.

2 Claims, 12 Drawing Figures

ROTARY COMBUSTION ENGINE

The invention relates generally to a rotary combustion engine, conventionally referred to as a Wankel engine and, more particularly, to an improvement thereof affecting the speed ratio between the piston or rotor and the output shaft.

The internal combustion engine is essentially a high-speed low-torque power source. With the possible exception of special generators and turbine compressors, driven devices usually require low-speed high-torque power. Consequently, speed-reducing gear-boxes are required in most applications before engine power can be put to a useful purpose. However, in the case of positive displacement engines, whether reciprocating or rotary, the power produced is in the form of discrete torque pulses that can interact with the load pulses to which gear teeth are subjected and can subsequently cause surface spalling of gear teeth or even premature failure of a tooth itself.

In the case of stationary power systems the gear-box can be made strong enough to withstand the forces arising from torque pulses or a complex torque-attenuating device can be installed, as system weight, size and complexity are minor considerations. In transportation service, however, the weight, size and complexity of any component are of paramount importance, especially in aeronautical service. For example, in general the thrust produced by a propeller relative to the power absorbed increases with increasing diameter and decreasing rotational speed. Nevertheless, it is preferable in the general aviation field to use small high-speed propellers in light aircraft service than to add the weight and complexity of a gear-box to the propulsion system.

Propellers operating at speeds well below 2500 rpm would not only be more efficient than the propellers in general service but would be considerably quieter as well. However, most aircraft reciprocating engines produce rated power between 2500 and 3500 rpm. and would be more efficient if adjusted to operate at even higher speeds. Rotary combustion engines are operated routinely between 5000 and 7000 rpm. Obviously, if these engines developed rated power at lower speeds it would be advantageous. Unfortunately, reciprocating engines are kinematically so simple that little can be done to alter their torque-speed relationship except by volumetric changes, which would decrease their efficiency and increase their weight. In contrast, the conventional or Wankel-cycle rotary engine is kinematically quite complex, and amenable to a considerable change in its torque-speed relationship without a corresponding volumetric change.

The present invention concerns a kinematic change in the rotary combustion engine that permits the drive shaft to rotate at rotor speed instead of at three-times rotor speed as in the conventional rotary engine.

In the conventional rotary combustion engine, the power rotor both rotates and orbits in the combustion chamber to provide the variable volume spaces required for charge induction, compression, expansion and exhaust. It is this complex rotation and orbital motion of the rotor that when transmitted through an eccentric to the drive or output shaft results in the shaft rotating at three-times rotor speed. In the present invention, the rotor motion is transmitted to the drive shaft by means of either a linkage or gear coupling that cannot transmit orbital motion, resulting in the drive or output shaft rotating at rotor speed.

Because three expansion stages will occur for each revolution of the drive shaft in the engine embodied in this invention as compared to one expansion stage for the conventional engine, the torque produced will be approximately three times that of the conventional engine. Thus, the kinematic change will not alter the power output of the engine, but will simply permit the power to be realized at lower engine speed.

It is therefore the primary object of the present invention to provide a rotary combustion engine in which the output shaft rotates at the same speed as the rotor whereby the need for speed reducing gear boxes or the like is eliminated; and which makes it possible to use the rotary engine in applications where formerly speed reducing devices have negated the use thereof as, for instance, in the aircraft industry.

An aspect of the present invention resides in the provision of a rotary combustion engine which includes a suitable housing and a rotary piston means — or rotor — which has a substantially triangular profile. The piston is eccentrically supported for rotary motion within the housing with the speed ratio between the support and the piston being substantially 3:1. The piston has an axis of rotation arranged eccentrically relative to the axis of rotation of the rotatable power output member. A coupling arrangement connects the piston to the power output member to establish a 1:1 speed ratio between the power output and the piston in response to rotary motion of the piston.

For a better understanding of the present invention, together with other and further objects thereof, reference is had to the following description taken in connection with the accompanying drawings, and its scope will be pointed out in the appended claims.

Figure 6:
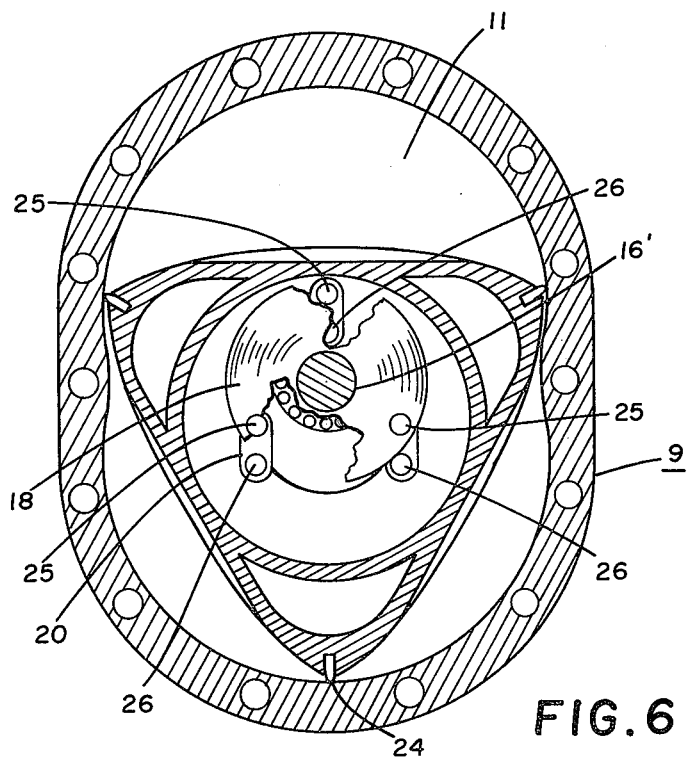
FIG. 6 is a sectional view taken along line 5—5 of FIG. 5.
Figure 5:
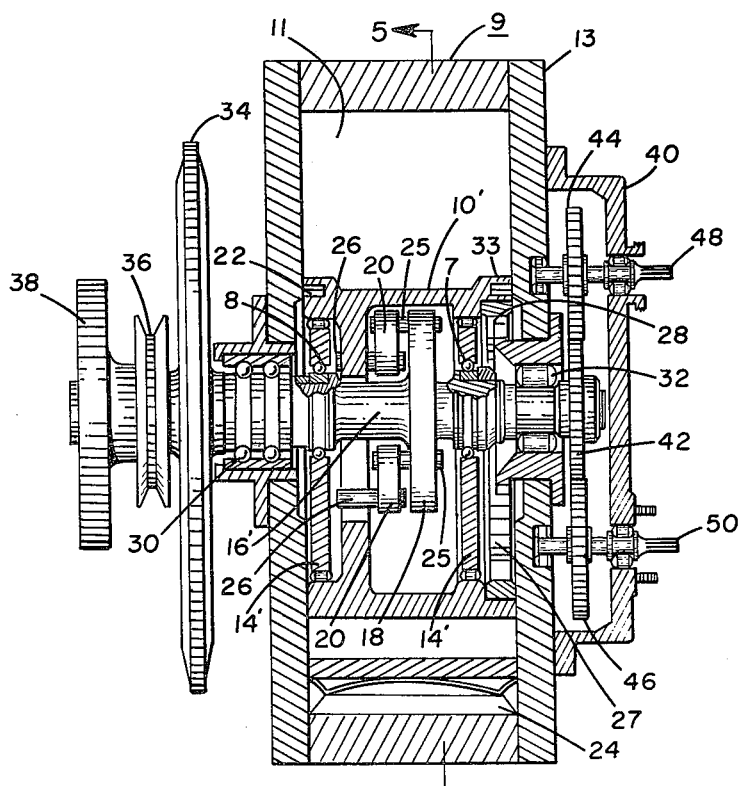
FIG. 5 is, generally, a longitudinal sectional view of the engine in accordance with the invention.
Figure 7:
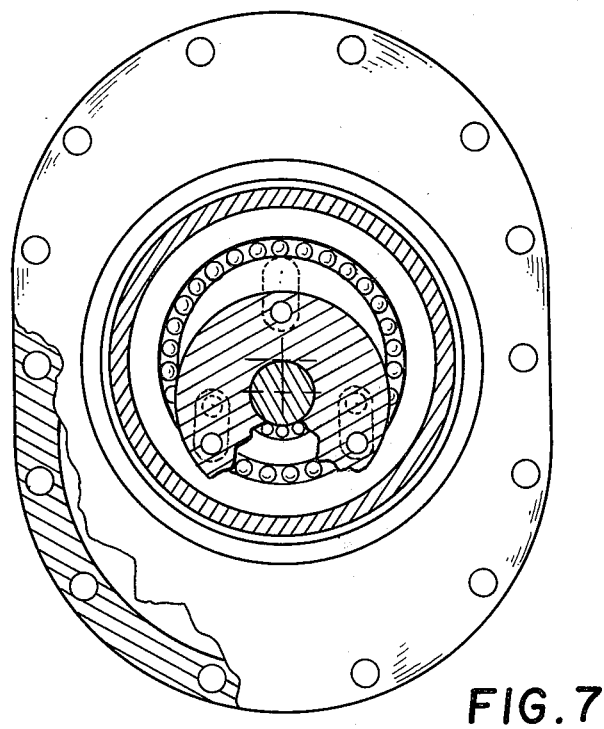
Figure 8:
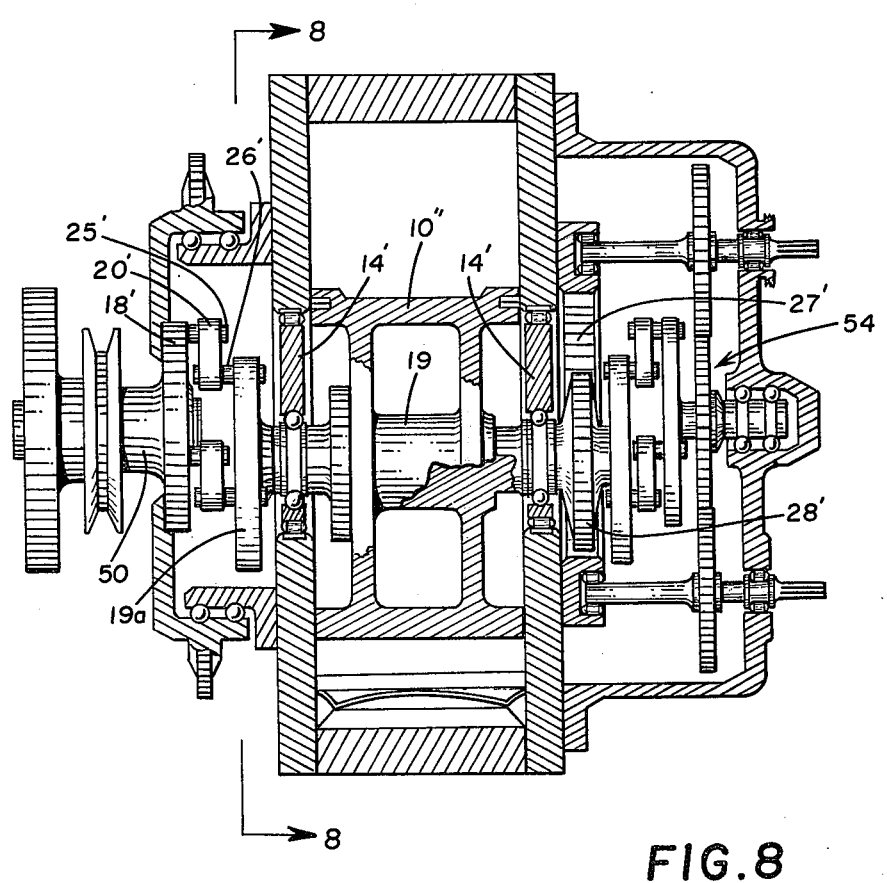
Figure 9:
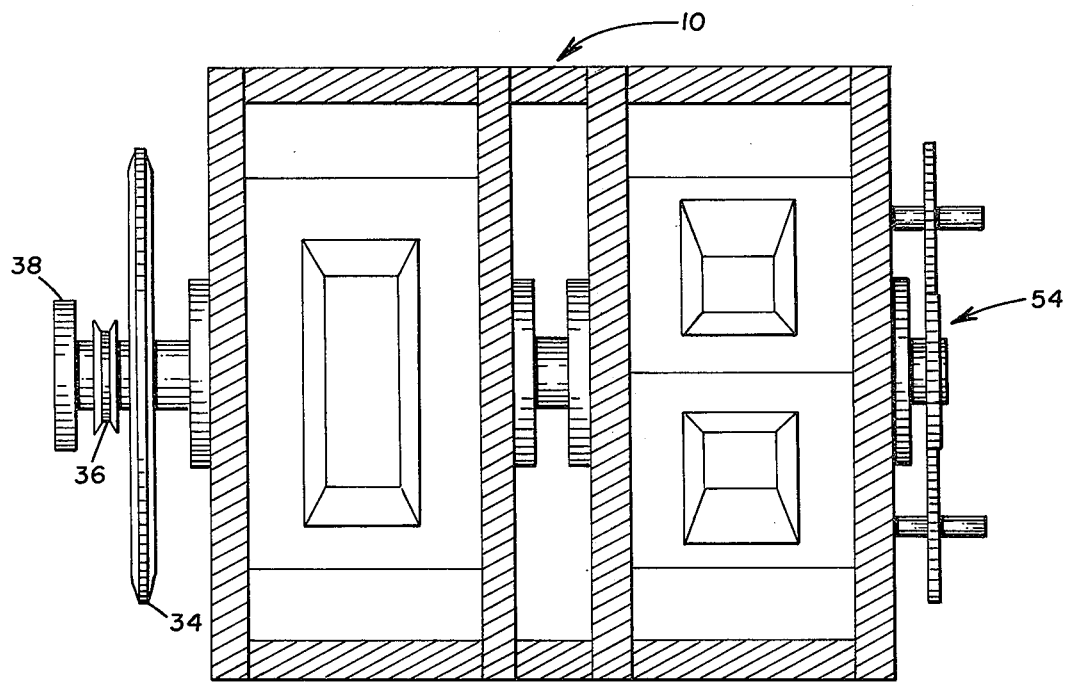
Figure 10:
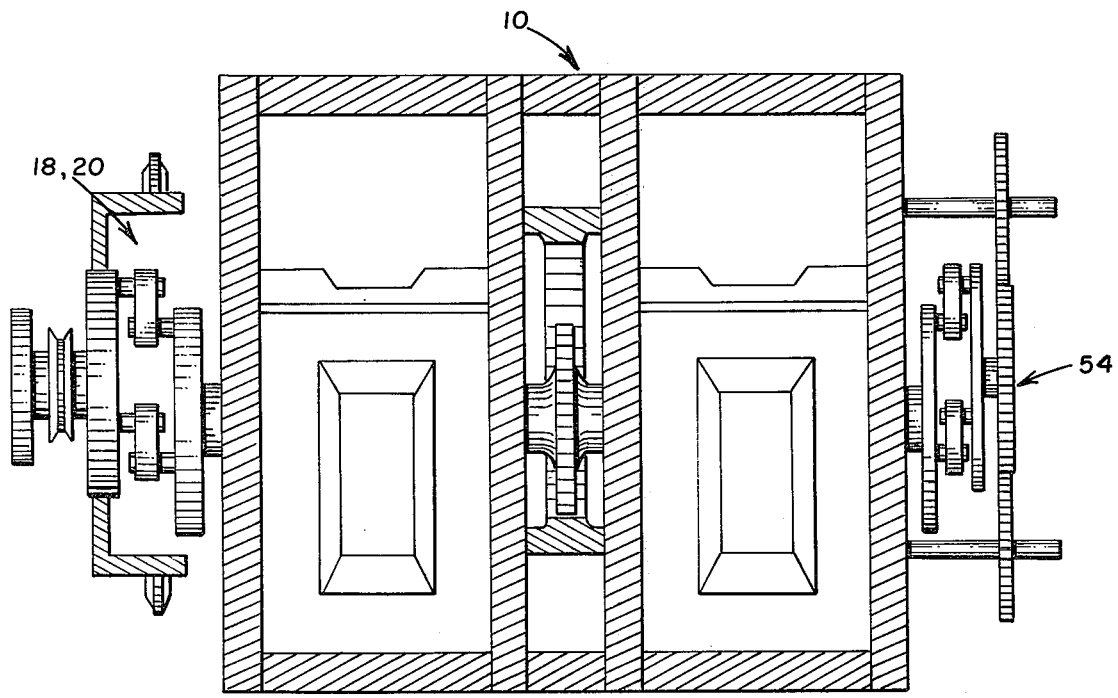

FIGS. 7 and 8 are similar to FIGS. 5 and 6, respectively, illustrating views of a modified embodiment with FIG. 7 being a sectional view taken along line 8-8 of FIG. 8;

FIGS. 9 and 10 are schematic drawings of double piston arrangements of the engines illustrated in FIGS. 5 and 7, respectively; and FIGS. 11 and 12 are again views similar to FIGS. 5 and 6, respectively, illustrating a further modification of the invention, with FIG. 11 being a sectional view taken along line 12—12 of FIG. 12.

Figure 1:
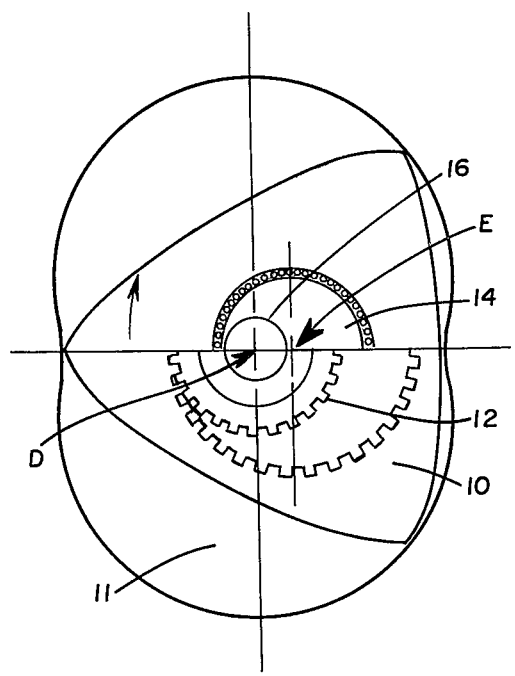
FIGS. 1 and 2 are kinematic diagrams of a conventional rotary engine showing the rotor in two positions.
Figure 2:
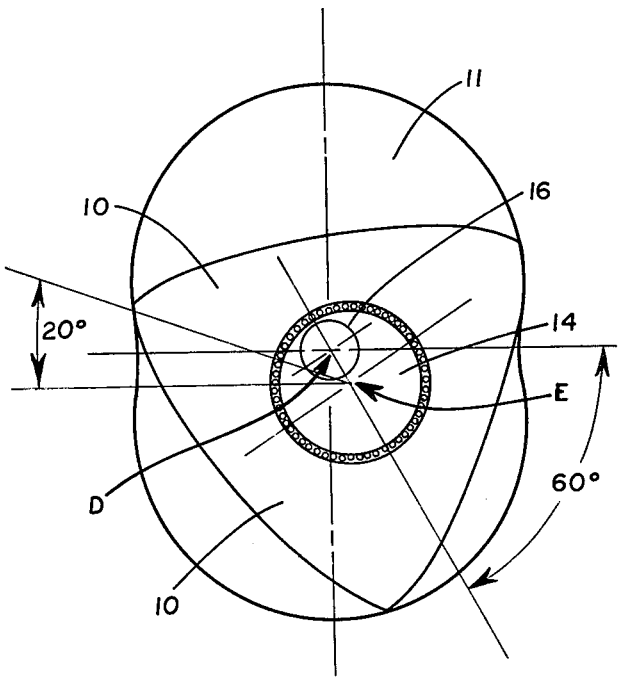

Referring now to the drawings, there is shown in FIG. 1 the center E of a conventional trochoidal rotor 10 displaced from the center D of a epitrochoidal chamber 11 of a rotary combustion engine. The rotor 10 includes rigidly secured phasing gears 12 which define the angular position of the rotor and an eccentric 14 which defines the orbital position of the rotor. The expansion of combustion gases in chamber 11 causes the rotor 10 to rotate about its own center and causes the rotor center to orbit along a circular path about the center of the chamber 11. This complex motion occurs because while the eccentric member 14 is centered on the rotor 10, its own center of rotation is about a shaft member 16 to which it is rigidly secured and which rotates about the chamber center. Consequently, the eccentric member 14 rotates through three full revolutions for each revolution of the rotor 10. This motion is illustrated in FIG. 2, which shows that a 20° rotation of the rotor 10 results in a 60° rotation of the eccentric member 14. The eccentric member 14 in the conventional engine is the sole element transmitting torque from the rotor 10 to the shaft member 16, which constitutes the drive or power output shaft of the engine. Consequently, engine speed is three times rotor speed in the conventional rotary combustion engine.

Figure 3:
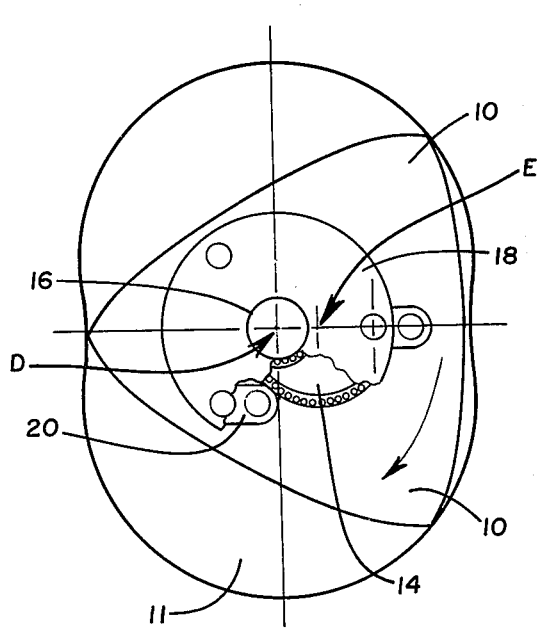
FIGS. 3 and 4 are kinematic diagrams of a rotary combustion engine according to the present invention showing the rotor in two positions.

FIG. 3 illustrates the kinematic system as is embodied in the present invention. All of the kinematic elements present in the conventional engine are still present, including the phasing gears, not shown, and the eccentric member 14, but the eccentric is no longer the torque transmitting element between the rotor and the drive shaft. As in the conventional engine, the rotation of the eccentric member 14 is about the shaft member 16, but the eccentric member 14 is no longer fixed to the shaft but instead is free to rotate about it.

Figure 4:
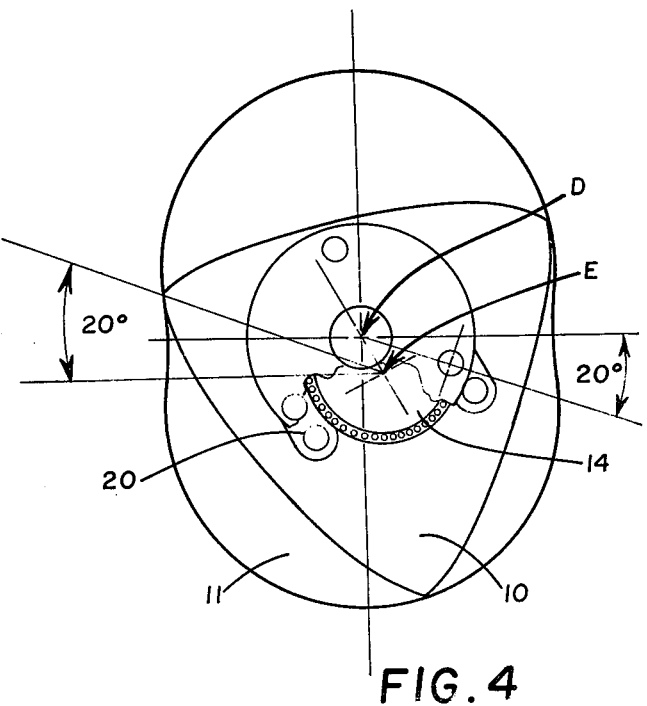

Secured to the output shaft 16 is a disc element 18 which by means of pivotable swivel elements 20 is connected to the rotor or piston means 10. The length of the swivel elements 20 is equal to the displacement of the rotor center from the chamber center. The disc 18 and swivel elements 20 constitute the linkage coupling. The coupling 18,20 will not transmit orbital motion, only the rotation of the power producing element about its own center which, in this case, is the rotor center. Orbital motion causes the swivel elements 20 to simply rotate and not transmit torque. Consequently, the disc element rotates through one full revolution for each revolution of the rotor. This motion is illustrated in FIG. 4, which shows that a 20° rotation of the rotor 10 results in a 20° rotation of the disc 18. The disc 18 is the element that transmits torque from the rotor 10 to the power output shaft 16. Consequently, engine speed is equal to rotor speed in the rotary engine embodied in this invention, which is one-third the engine speed of the conventional rotary engine.

FIGS. 5 and 6 illustrate a rotary engine incorporating the linkage coupling 18,20 as the torque transmitting element between the rotor 10' and the drive shaft 16. The engine comprises a conventional housing 9 defining epitrochoidal combustion chamber 11. The trochoidal rotor 10' has a trochoidal or substantially triangular profile and rotates within the chamber 11 and is provided with conventional side seals 22 and apex seals 24. The rotor orbital motion within the chamber is defined by the two eccentric elements 14' secured circumferentially between axially protruding portions 33 of rotor 10' and mounted about rotatable bearings 7 and 8. The bearings 7,8 can be of a light construction as neither eccentric is a torque transmitting element. The disc element 18 is rigidly secured on the drive shaft 16' and, as shown in the preferred embodiment of FIG. 6, three swivel elements 20 are pivotably secured to the disc 18 by three parallel extending pins 25 equally spaced from the axial center of the disc 18 and from each other. The linkage coupling further includes three parallel extending pins 26 secured to the rotor 10' to support the opposite ends of the swivel members 20. Each swivel 20 is suitably mounted for relative rotation on ball bearings or the like, not shown, and rotatably secured to the power output shaft, with each swivel having an axis of rotation located equidistant to the axis of rotation of the power output shaft. The same geometric relationship is established relative to rotor 10'. Also, the axis of rotation of each swivel is located equidistantly to the corresponding axis of rotation of the other swivels.

The angular displacement of the rotor 10' within the epitrochoidal chamber 11 is defined by a conventional ring gear 27 secured to the rotor 10' and phasing gear 28 secured to the chamber wall 13. The drive shaft 16 rotates at rotor speed on bearings 30 and 32. The engine is illustrated with a conventional starter gear and flywheel 34, generator pulley 36 and attachment flange 38. A conventional accessory gear-box 40 is shown with a gear 42 secured to the drive shaft 16' and meshing with gears 44 and 46 secured to the conventional accessory drive shafts 48 and 50, respectively. In the context of the present invention the shaft 16' as well as elements 34, 36,38, etc., mounted thereon constitute part of the power output arrangement.

FIGS. 7 and 8 illustrate an alternate embodiment of the invention. The engine is kinematically identical to the engine illustrated in and described with respect to FIGS. 5 and 6. In this embodiment, however, the eccentric member 14' and gears 27' and 28' have been displaced from the epitrochoidal chamber. The rotor 10'' is fixed to the shaft 19 which is rotatably supported by the eccentrics 14'. Consequently, the shaft 19'' rotates about its own center and orbits about the center of the chamber 11 with the rotor 10''. Thereby, in a theoretical sense, the shaft 19 including flanged portion 19a, constitutes part of the piston or rotor arrangement. The rotary coupling arrangement (18',20',2-5',26') is coupled to the rotor via members 19a 19, etc. Because the linkage coupling elements 18',20',25' and 26' transmit only the rotary motion of the shaft/rotor (10'',19) to the element 18' which is fixed to drive shaft 50, the drive shaft rotates at rotor speed. The accessory drive is shown with a linkage coupling assembly 18',20' to transmit power to the accessory gear 54.

While FIG. 5 illustrates arrangement of the coupling assembly within the hollow rotor, in FIG. 8 it is mounted external to the rotor.

In the conventional trochoidal rotor engine the expansion stage does not fully extend over the compression stage so that a torque reversal occurs that covers almost ten percent of a rotor revolution. Consequently, the driving force is reversed and work must be put into the engine to carry the rotor through the compression stage. This work is usually supplied by the energy stored in the flywheel. Nevertheless, the torque reversals are not conducive to smooth operation of rotary combustion engines.

The torque reversals can be eliminated, however, by coupling two separate combustion chambers in series with their rotors on the same shaft but 180° out of phase. Consequently, expansion is occurring over a full revolution of the drive shaft.

In the embodiment of this invention illustrated in FIGS. 5 and 6, coupling involves essentially joining the drive shafts of two engines with their rotors 180° out of phase, as shown in FIG. 9. However, in the embodiment of this invention illustrated in FIGS. 7 and 8, the shaft member is not only rotating but is also orbiting. Consequently, the rotors must be in phase, as shown in FIG. 10. The expansion stages will still be 180° out of phase, however, if the intake and exhaust ports to one combustion chamber are on opposite sides of the engine relative to the ports to the other chamber.

In either embodiment of the invention, a two-chamber engine will have six expansion stages per shaft revolution, which is equivalent to a twelve-cylinder four-cycle reciprocating engine.

Figure 11:
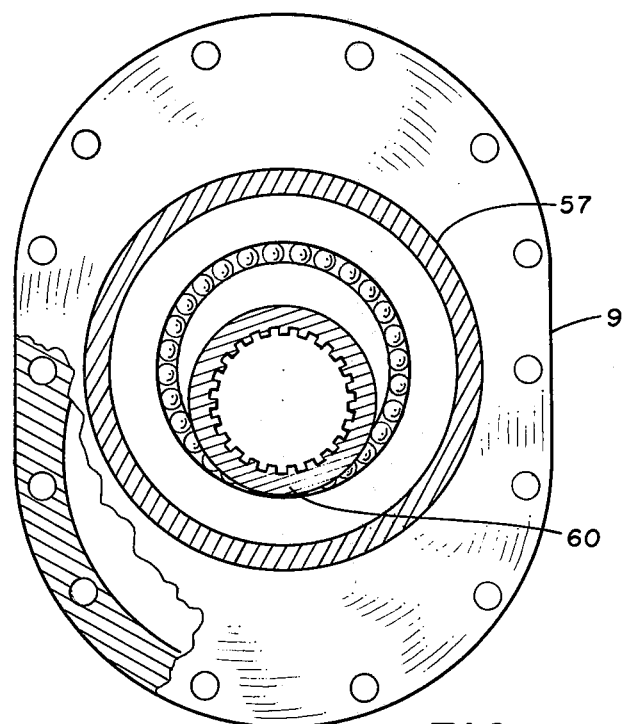
Figure 12:
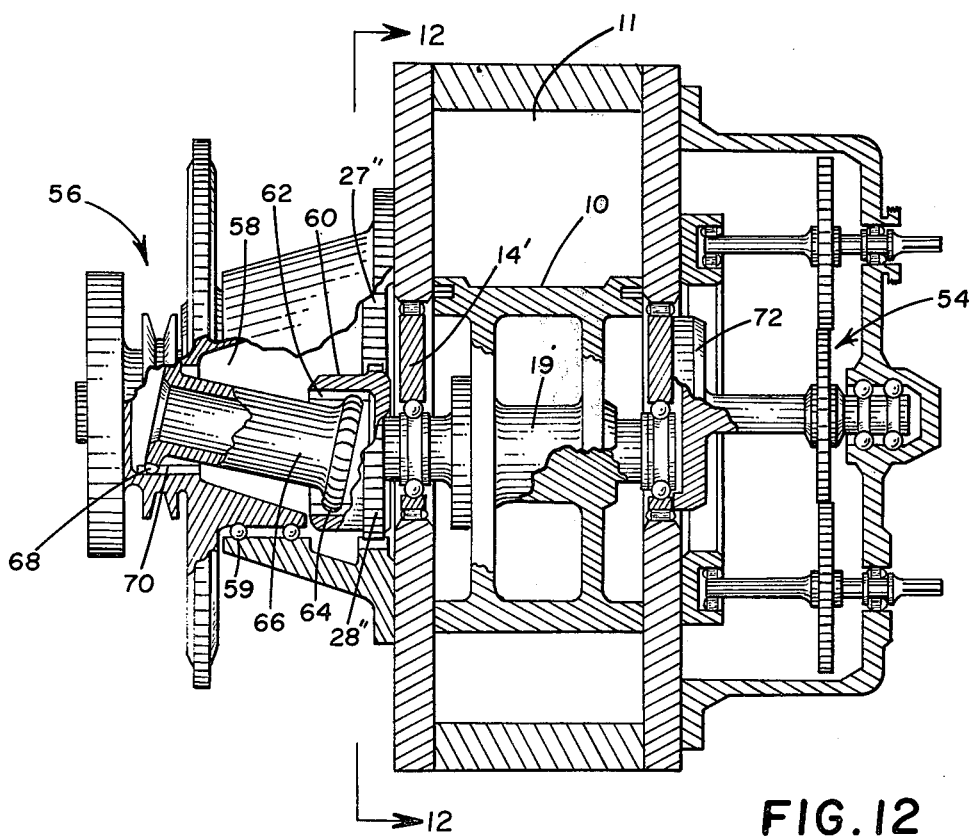

In FIGS. 11 and 12, as in the engine illustrated in FIGS. 7 and 8, the eccentric member 14' and phasing gears 27" and 28" have been displaced from the epitroichal chamber 11, and the rotor 10 is fixed to the shaft 19' which is supported by the eccentrics 14'. However, the linkage coupling between the shaft 19 and drive structure 56 is now replaced by a gear coupling arrangement 58. Herein, a housing sleeve 60 is fixed to shaft 19 so as to rotate with rotor 10. The housing 60 is formed with an internal gear 62, which is in meshing engagement with gearing 64 formed on one axial end of a coupling shaft 66. The opposite end of shaft 66 is similarly geared, see 68. The gear 68 meshes with internal gear 70 formed in the hollow, rotatably supported drive our output structure 56 to permit shaft 66 to transmit power between the rotor 10 and the output or drive structure 56. The drive structure 56 is supported on bracket 57 secured to housing 9 with roller bearing 59 interposed therebetween.

While the axial end of shaft 66 provided with gears 64 and disposed adjacent to the rotor 10 rotates in an eccentric orbit parallel to the orbit defined as a result of rotation of the rotor, the opposite end of shaft 66 is disposed to rotate in a non-eccentric orbit. During operation, the axis of rotation of shaft 66 is disposed at all times at an angle to the axis of rotation of the rotor 10.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. A rotary combustion engine comprising:
    a piston housing:
        rotary piston means with a substantially triangular profile;
        eccentric support means rotatably mounted within the walls defining the piston housing for supporting said piston means for rotary and orbital motion within said housing at a speed ratio between said support and said piston means of substantially 3:1;
        rotable power output means, said piston means having an axis of rotation arranged eccentrically relative to the axis of rotation of said rotatable power output means;
        coupling means connecting said piston means to said power output means and being effective to establish a 1:1 speed ratio between said power output means and said piston means in response to rotary and orbital movement of said piston means.

2. A rotary engine according to claim 1, wherein one said coupling means is connected to said piston means external to said piston housing at each axial end of the piston means.

* * * * *